(12) United States Patent
Nottingham et al.

(10) Patent No.: US 7,107,691 B2
(45) Date of Patent: Sep. 19, 2006

(54) ELECTRIC KNIFE ADAPTED FOR SAFELY CARVING PUMPKINS AND OTHER FRUITS AND VEGETABLES

(75) Inventors: John R. Nottingham, Bratenahl, OH (US); John W. Spirk, Gates Mills, OH (US); Trevor L. Jaokson, Kirtland, OH (US); Don C. Fuchs Jr., Mentor, OH (US); Doug Gall, Strongsville, OH (US)

(73) Assignee: Emerald Innovations LLC, Butler, PA (US)

( * ) Notice: Subject to any disclaimer, the term of this patent is extended or adjusted under 35 U.S.C. 154(b) by 0 days.

(21) Appl. No.: 10/885,047

(22) Filed: Jul. 6, 2004

(65) Prior Publication Data

US 2006/0005402 A1    Jan. 12, 2006

(51) Int. Cl.
B23D 49/00    (2006.01)
(52) U.S. Cl. .......................................... 30/392; 446/144
(58) Field of Classification Search ......... 30/392–394, 30/277.4, 355, 272.1; 446/140, 144; D7/646, D7/696, 61
See application file for complete search history.

(56) References Cited

U.S. PATENT DOCUMENTS

| | | | | |
|---|---|---|---|---|
| 3,128,805 A | * | 4/1964 | Silver | 144/1.1 |
| 3,234,649 A | * | 2/1966 | Preble et al. | 30/277.4 |
| 3,276,118 A | * | 10/1966 | Taylor | 30/277.4 |
| 3,315,356 A | | 4/1967 | Swanke | |
| D207,767 S | * | 5/1967 | Bremshey et al. | D7/646 |
| 3,316,636 A | * | 5/1967 | Raper, Jr. et al. | 30/210 |
| 3,337,954 A | * | 8/1967 | Robison | 30/277.4 |
| 3,338,276 A | * | 8/1967 | Reuterfors | 30/332 |
| 3,388,470 A | | 6/1968 | Ufer | |
| 3,417,469 A | | 12/1968 | Cousins | |
| 3,418,713 A | * | 12/1968 | Bauer | 30/277.4 |
| 3,555,678 A | | 1/1971 | Agulnick | |
| 3,679,958 A | | 7/1972 | Chambers | |
| 3,885,307 A | | 5/1975 | Papalardo | |
| 3,895,442 A | * | 7/1975 | Langford | 30/332 |
| 3,981,078 A | | 9/1976 | Alberti | |
| 4,296,659 A | | 10/1981 | Nauman | |
| 4,348,807 A | | 9/1982 | Ashdown | |
| 4,349,961 A | * | 9/1982 | Pendleton | 30/342 |
| D268,639 S | * | 4/1983 | Johannsen | D7/650 |
| 4,656,936 A | | 4/1987 | Bardon | |
| 4,674,154 A | | 6/1987 | Gilbert | |

(Continued)

FOREIGN PATENT DOCUMENTS

WO    WO 03/045211    6/2003

OTHER PUBLICATIONS

Photograph of Ariete Pelapatate battery operated potato peeler, p. 1.

(Continued)

*Primary Examiner*—Timothy V. Eley
*Assistant Examiner*—Jason Prone
(74) *Attorney, Agent, or Firm*—Calfee, Halter & Griswold LLP

(57) ABSTRACT

According to one embodiment of the present invention, an electric knife is provided that includes a blade that is adapted to cut the pulp and shell of pumpkins and other fruits and vegetables but not readily cut the skin and flesh of humans. According to a preferred embodiment of the present invention, the electric knife also includes a shield that that is adapted to prevent fruit or vegetable matter from entering the housing of the electric knife.

13 Claims, 8 Drawing Sheets

U.S. PATENT DOCUMENTS

| | | | |
|---|---|---|---|
| 4,689,885 A | 9/1987 | Albanese | |
| 4,711,030 A | 12/1987 | Ruston, Sr. | |
| 4,841,638 A | 6/1989 | Bardeen et al. | |
| 5,018,421 A * | 5/1991 | Lucki et al. | 83/835 |
| D320,724 S | 10/1991 | Rixen | |
| 5,058,273 A | 10/1991 | Streger | |
| 5,145,298 A * | 9/1992 | Marantette | 384/247 |
| 5,606,900 A * | 3/1997 | Stoddard | 83/846 |
| 5,655,861 A | 8/1997 | Bardeen | |
| 5,687,484 A | 11/1997 | Hahn | |
| 5,778,541 A | 7/1998 | McClung | |
| 5,832,615 A | 11/1998 | Costen et al. | |
| 5,855,158 A * | 1/1999 | Donofrio | 83/835 |
| 5,933,968 A | 8/1999 | Solomon | |
| 6,062,939 A * | 5/2000 | Parker et al. | 446/145 |
| 6,082,253 A | 7/2000 | Ridler | |
| 6,185,828 B1 * | 2/2001 | Schmidt | 30/272.1 |
| 6,267,036 B1 | 7/2001 | Lani | |
| D449,497 S | 10/2001 | Sham | |
| 6,305,089 B1 * | 10/2001 | Berndt | 30/374 |
| 6,327,971 B1 | 12/2001 | Ridler | |
| 6,408,520 B1 | 6/2002 | Ridler | |
| D460,326 S * | 7/2002 | Wong et al. | D7/646 |
| 6,434,836 B1 | 8/2002 | Olivares | |
| 6,487,779 B1 | 12/2002 | Underthun | |
| 6,497,046 B1 | 12/2002 | Bardeen et al. | |
| 6,640,445 B1 * | 11/2003 | Crawford | 30/277.4 |
| 6,671,964 B1 | 1/2004 | Ruiz | |
| 6,722,042 B1 | 4/2004 | Naville, Jr. | |
| 6,805,032 B1 | 10/2004 | Engdahl | |
| D508,389 S * | 8/2005 | Polk | D7/646 |
| 2002/0178589 A1 | 12/2002 | Wong et al. | |
| 2003/0070298 A1 | 4/2003 | Ruiz | |
| 2003/0192191 A1 | 10/2003 | Wong | |
| 2003/0200664 A1 | 10/2003 | Thompson | |
| 2004/0055437 A1 | 3/2004 | Engdahl | |
| 2004/0187662 A1 | 9/2004 | Ulmer | |
| 2004/0200079 A1 | 10/2004 | Stoughton | |

OTHER PUBLICATIONS

Photographs of product packaging for battery operated Power Pumpkin Carver, p. 1-7.

Battery Operated Speedy Peel will peel fruits and vegetables without hand strain, Dynamic Living, Online Advertising, p. 1-4.

Internet Product Order Form, Dremel Pumpkin Carving Kit, from website www.dremel.com, 2003.

Internet Product Order Form, Wizard Peelmaster, from website www.juicersforless.com.

Internet Product Order Form, Vegetable Peeler, Panomagico, from website www.pannomagico.it.

Pumpkin Masters Power Master Power Saw Carving Kit, Jun. 2006.*

* cited by examiner

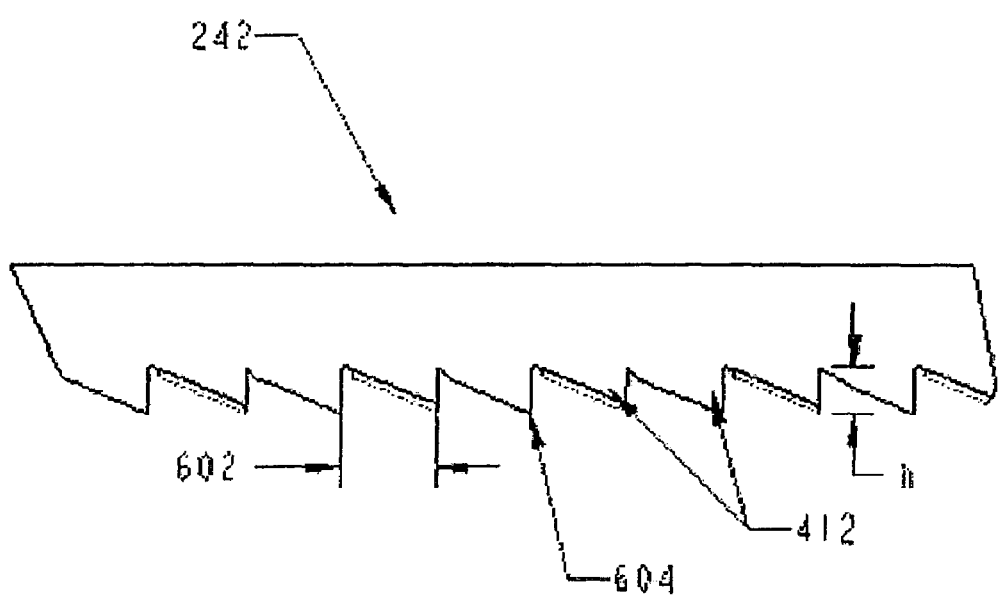

ELECTRIC KNIFE ADAPTED FOR SAFELY CARVING PUMPKINS AND OTHER FRUITS AND VEGETABLES

TECHNICAL FIELD

The present invention relates generally to an electric knife. More particularly, the present invention relates to an electric knife that includes a blade that is adapted to safely carve the shell and pulp of pumpkins or other vegetables as well as synthetic pumpkins.

BACKGROUND OF THE INVENTION

The activity of pumpkin carving or the carving of decorative designs in other fruits or vegetables is a popular pastime. Many hand operated knifes, saws and other cutting instruments have been developed to perform this task. In addition, hand operated cutting instruments have been developed that are capable of cutting through vegetable matter but do not easily cut the flesh of a human.

Pumpkins and other similar vegetables possess firm shells in which decorative designs can be carved. Often times, the carver desires to carve intricate details in the shell of the vegetable. With the hand operated cutting implements that exist today, this can be a difficult task. To successfully carve a pumpkin, the carver must exert the physical force on the cutting implement necessary to cut through the shell of the pumpkin. However, when the carver is exerting the necessary force on the cutting implement, it can be difficult to accurately follow curved lines or carve intricate details in the pumpkin, and mistakes are frequently made that detract from the appearance of the finished carving. Also, when the necessary force is being exerted on the cutting implement, it is often difficult to stop the blade at the proper location. This results in over-cutting which can prevent the carver from achieving the desired design.

Typically, the hand operated instruments that possess safety blades that cut through vegetable matter but do not easily cut human flesh are duller than the traditional knifes, saws, and other instruments used for carving pumpkins. Therefore, these safety knives require more physical force to operate than other traditional cutting implements. This makes the carving of a pumpkin with one of these safety knives even more difficult.

Accordingly, it would be desirable to develop an electric knife for use in the carving of pumpkins that has a blade that is adapted to safely cut through vegetable matter but not readily cut human flesh. It would be beneficial if the electric knife possessed a blade that was configured to precisely and accurately carve detailed designs and curved incisions into the pumpkin shell. Such an electric knife would allow for faster, more precise carving of pumpkins with less physical force being required but would also be safer than conventional knives. In addition, it would be advantageous for the electric knife to include a shield that prevents any water, vegetable fluids or other material from entering the housing of the electric knife. It would also be advantageous if the components of the knife were optimized in light of the considerations of safety, manufacturing cost, and effectiveness of cutting.

SUMMARY OF THE INVENTION

Accordingly, the present invention provides an electric knife that includes a blade that is adapted to cut the pulp and shell of pumpkins and other fruits and vegetables but not readily cut the skin and flesh of humans. The invention further provides these safety features in an instrument that still effectively allows the user to accurately and efficiently carve intricate and detailed designs into the vegetable flesh.

BRIEF DESCRIPTION OF THE DRAWINGS

FIG. 6 is a magnified elevation view of several teeth of the blade of FIG. 3.

DETAILED DESCRIPTION OF THE INVENTION

Figure 1:
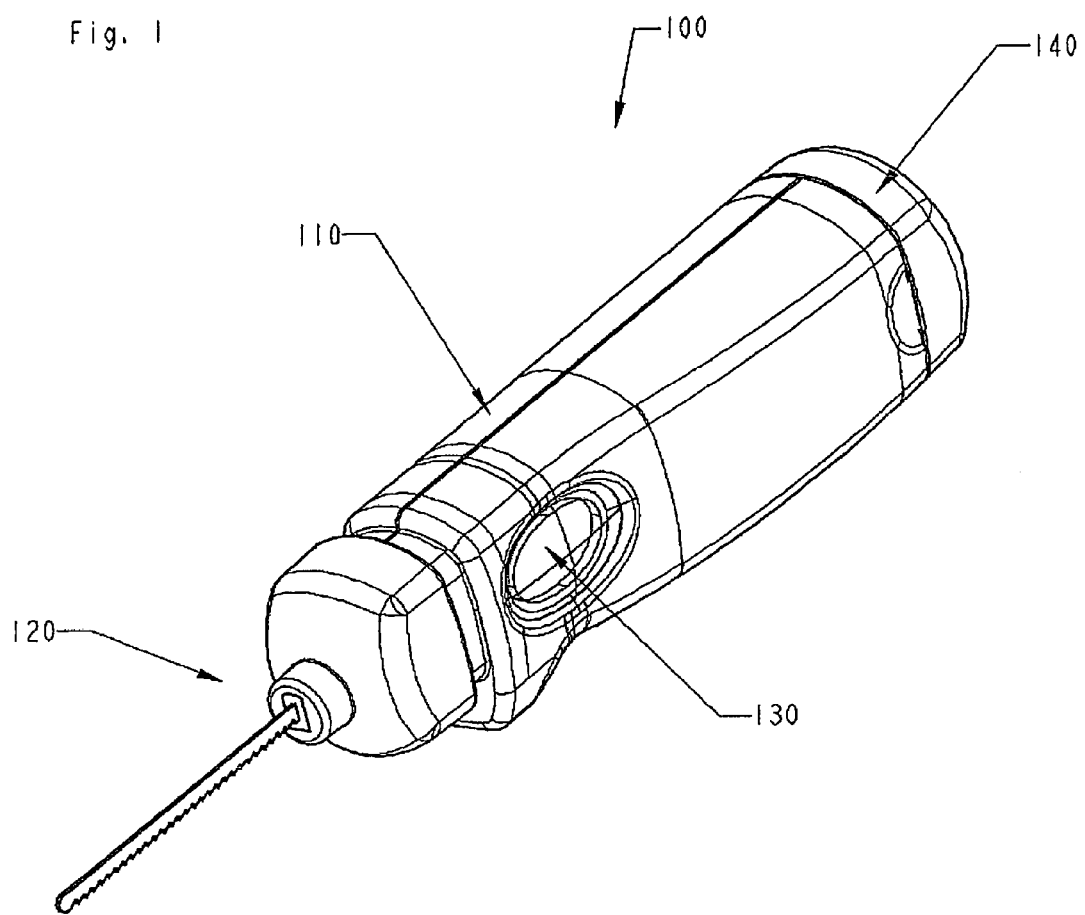
FIG. 1 is a perspective view of one embodiment of an electric knife of the present invention.

The present invention relates to an electric knife and, in particular, to an electric knife that includes a blade that is adapted to safely carve the shell and pulp of pumpkins or other vegetables but not readily cut the flesh of a human. The present invention also effectively cuts synthetic pumpkins and other synthetic fruits or vegetables. The invention is applicable to electric knives of varying constructions for the carving of pumpkins or other vegetables. As representative of the invention, FIG. 1 illustrates an electric knife 100 in accordance with a first embodiment of the invention. As shown in FIG. 1, the electric knife 100 of the illustrated embodiment generally includes a housing 110, a blade assembly 120, an activation switch 130, and a battery cap 140.

Figure 2:
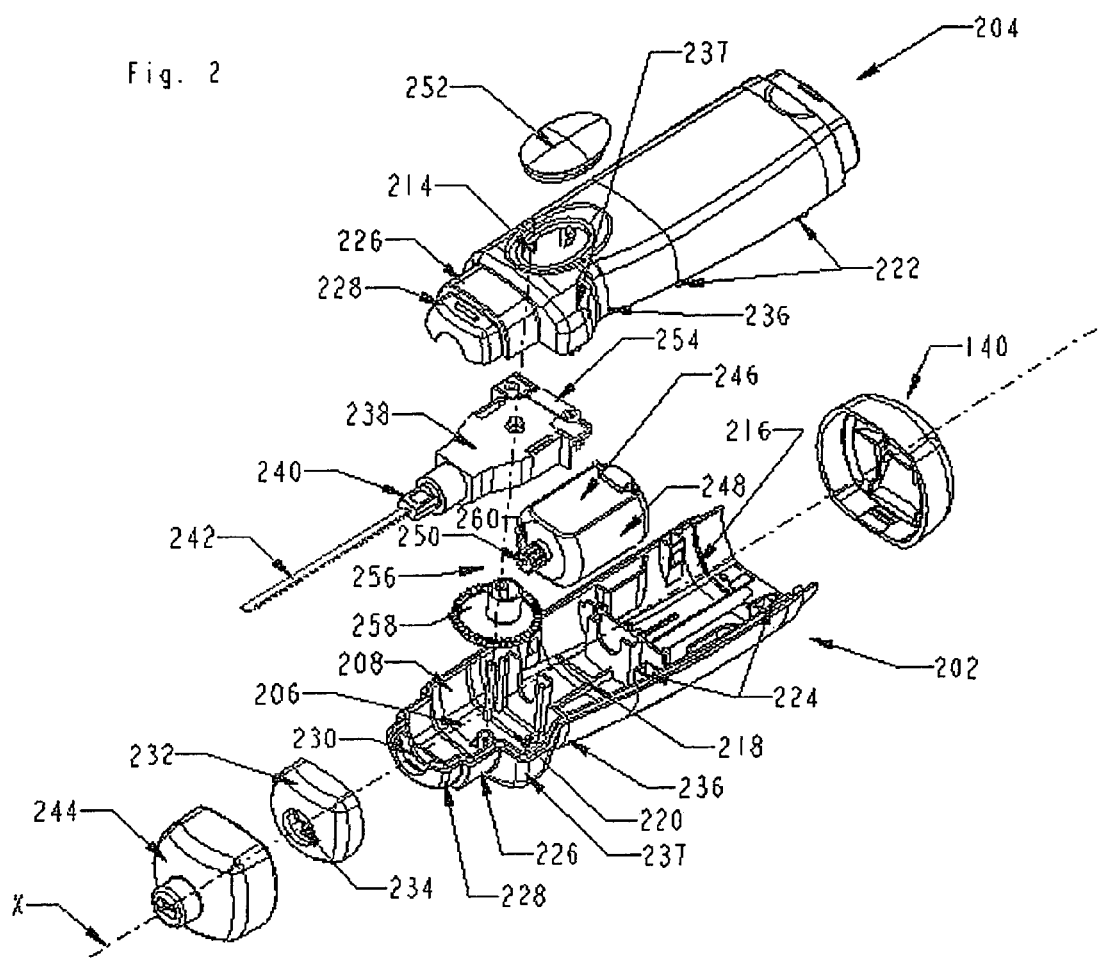
FIG. 2 is an exploded perspective view of the electric knife of FIG. 1.

The electric knife 100 includes a housing 110. As illustrated in FIG. 2, the housing 110 of electric knife 100 includes a base 202 and a cover 204. Both the base 202 and the cover 204 are preferably molded from plastic but other suitable materials can be used. The configurations of the base 202 and cover 204 are adapted to support and enclose other components of the electric knife 100. In the illustrated embodiment, both the base 202 and cover 204 have a generally flat main wall 206 and a pair of side walls 208 that extend from the main wall to form a partially closed space. An activator switch opening 214 is defined within the main wall 206 of the cover 204. The base 202 and cover 204 each have a generally C-shaped cross section when viewed from the side, i.e., the right as shown by FIG. 2.

The side walls 208 of the cover 204 and the base 202 are complimentary with each other. Thus, when the cover 204 and the base 202 are assembled together, the partially closed spaces formed by the side walls 208 of both the base 202 and the cover 204 combine to form one closed space that encloses other components of the electric knife 100. As illustrated in FIG. 2, the closed space formed within the cover 204 and the base 202 is generally divided into a battery compartment 216, an electric motor compartment 218, and a gear assembly/blade mount compartment 220. It should be apparent to one skilled in the art, however, that the housing 110 could be configured differently. In the illustrated embodiment, the cover 204 and the base 202 are secured to each other by inter-engaging tabs 222 and slots 224. However, several other methods of assembling the base 202 and the cover 204 together could be used, such as glue, screws, etc.

The assembled housing 110 has a longitudinal axis X. In the illustrated embodiment, the cover 204 and the base 202 each have a shield mounting portion 226 that extends outward along the longitudinal axis X. The shield mounting portion 226 has a generally rectangular cross section, although other shapes could be used, such as cylindrical, and has smaller exterior dimensions than the remainder of the housing 110. The shield mounting portion could also be larger in dimension than the remainder of the housing, but it is preferred to be smaller. An end cap recess 228 and blade mount opening 230 are defined within the shield mounting portion 226 of the cover 204 and the base 202.

In the illustrated embodiment, a cup shaped end cap 232 with a rounded top is fitted onto the end cap recess 228 of the shield mounting portion 226 of the housing 110. A blade mount opening 234 is defined within the end cap 232 that corresponds with the blade opening 230. The end cap 232 reinforces the shield mounting portion 226 of the housing 110 and provides added stability; however, the present invention need not include such an end cap.

In the illustrated embodiment, corresponding side walls of the base 202 and the cover 204 include a contoured indentation 236 that is adapted to form to the fingers of the users hand. The side walls of the base 202 and the cover 204 also include a guard 237. In the illustrated embodiment, the guard 237 is a raised portion that projects outward from the housing and together with the contoured indentation 236 is designed to help securely locate the users hand and prevent it from slipping down the housing 110. The shape of both the contoured indentation 236 and guard 237 are adapted to ergonomically fit the hand of the user and provide a comfortable grip. This design of the housing 110 increases the effectiveness of the electric knife 100. The user can grasp the knife firmly and securely and rigorously carve without his/her hand slipping along the housing 110. Since the user can grasp the knife more securely the user can carve more accurately and comfortably and make fewer carving mistakes.

It should be apparent to someone skilled in the art that the shape and configuration of the housing 110 are not limited to the shape and configuration disclosed by the illustrated embodiment. The housing 110 need not include the contoured indentation 236, shield mount portion 226, or end cap 232. The housing 110 could be shaped in many different ways, for example it could be a cylindrical shape or a general box-like shape. Also, the housing 110 could be made up of several separate parts or it could be molded as one piece out of a suitable material, such as plastic.

Figure 3:
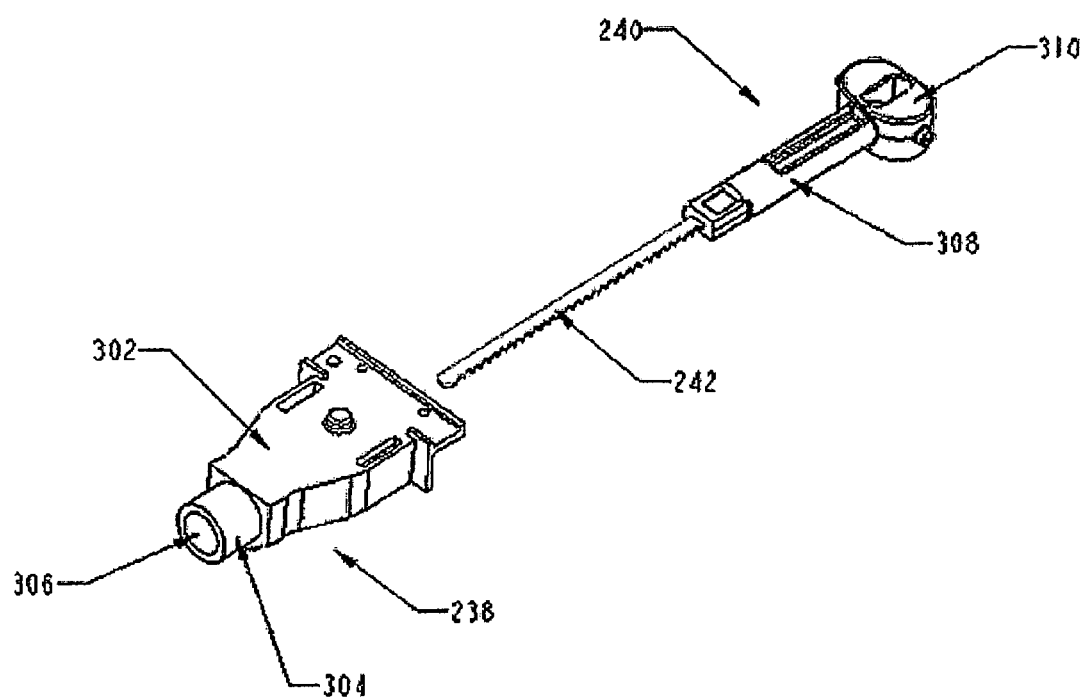
FIG. 3 is an exploded perspective view of the blade mount housing, blade mount and blade of the electric knife of FIG. 1.

The electric knife 100 includes a blade assembly 120. The blade assembly 120 includes a blade mount housing 238, blade mount 240, blade 242 and shield 244. The blade mount housing 238 is typically formed as one piece out of plastic, although the blade mount housing could be constructed as multiple pieces, and other materials, such as metal, could be used. As illustrated in FIG. 3, the blade mount housing 238 includes a main body portion 302 adapted to fit within the gear assembly/blade mount compartment 220 of the housing 110. A projection 304 extends from the main body portion 302 that is adapted to fit within the openings 230 and 234 defined within the shield mounting portion 226 of the housing 110 and the end cap 232. A blade mount opening 306 is defined within the projection 304 of the blade mount housing 238.

In the illustrated embodiment, the blade mount 240 is formed as one piece out of plastic, although the blade mount 240 could be constructed from multiple pieces, and other suitable materials, such as metal, could be used. The blade mount 240 includes a body portion 308. In the illustrated embodiment, this body portion is cylindrical, although other shapes could be used. A gear assembly receiver portion 310 extends from one end of the body portion. The blade mount 240 is housed within the blade mount housing 238 and is adapted to reciprocate forward and backward along the longitudinal axis X of the housing 110.

The blade 242 of the illustrated embodiment is a thin blade fashioned out of a suitable material, such as metal or plastic, that is stiff yet flexible. To effectively cut detailed designs and carve curved incisions into a pumpkin or other vegetable the blade 242 must be flexible. However, the blade 242 must be stiff enough to effectively pierce the shell and then cut through the shell and pulp of the pumpkin or other vegetable. In addition, due to the rigors of pumpkin carving, the blade 242 of the electric knife 100 must be resilient and be able to bend a large amount without breaking. This strong, thin blade allows a great deal of force to be applied to the knife in order to cut the shell and flesh of the pumpkin flesh while also providing the precision necessary to cut intricate designs.

During the design process of the present invention, blades formed from various materials were experimented with, such as carbon steel, stainless steel, and spring steel. The blade 242 of the illustrated embodiment is formed out of heat-treated spring steel, although many other materials could be used. The heat treated spring steel was chosen for this embodiment because it gives the blade 242 the needed amount of flexibility; the blade is stiff enough to pierce and carve the pumpkin or other vegetable and is flexible enough to effectively carve detailed designs. In addition, the blade 242 formed from spring steel is resilient and withstands a great amount of stress before breaking. If the blade 242 were to break, its breaking could produce a dangerous jagged edge. Accordingly, a blade 242 that is less likely to break when stressed is safer than one that is more likely to break. A heat-treated spring steel blade 242 was chosen because it provided the best balance of flexibility, resilience, and safety along with a low manufacturing cost.

Figures 4A, 4B:
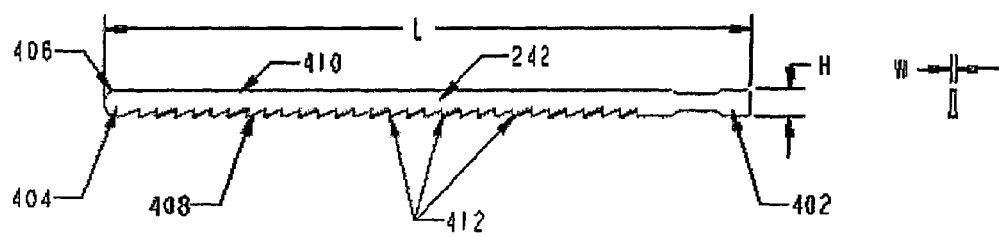
FIG. 4A is an elevation view of the blade of FIG. 3.
FIG. 4B is a view of the width of the blade of FIG. 3.

As shown in FIGS. 4A and 4B, the blade 242 has a shank end 402 and a free end 404. The shank end 402 is attached to the body portion 308 of the blade mount 240. In the illustrated embodiment, the shank end 402 of the blade 242 is molded into the body portion 308 of the blade mount, but it could also be attached in other ways, such as glue, a screw, or other fastener. In the illustrated embodiment, the free end 404 of the blade 242 terminates in a blunted safety tip 406. The radius of the safety tip 406 decreases its ability to puncture or scratch human skin.

The blade 242 has a generally rectangular cross-section, although other shapes of blade could be used. The blade 242 has a blade height H. The height H of the blade affects, among other things, both the resiliency of the blade and its cutting effectiveness. A blade with a smaller height H dimension can carve curved incisions more successfully since it has a smaller turning radius during carving. However, if the blade height H dimension is too small the blade would not be stiff enough to effectively carve a pumpkin or other vegetable and would break easily.

The blade 242 has a blade height H that is between 0.050 inches and 0.300 inches but is preferably between 0.100 inches and 0.200 inches. However, it should be apparent to one skilled in the art that other height dimensions could be used and the present invention is not limited to this expressed range of preferred blade heights. During the design process of the illustrated embodiment, blades with various heights were tested. The blade 242 of the illustrated embodiment has a height H of 0.118 inches. This height H was chosen for the blade 242 of the illustrated embodiment because it provides an optimal balance of the ability to successfully carve detailed designs and the strength to resist breaking during normal use.

Figure 5:
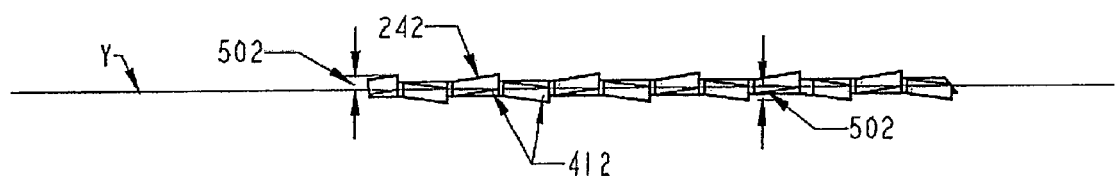
FIG. 5 is a magnified view of the underside of a portion of the blade of FIG. 3.

The blade 242 also has a blade width W. The width W of the blade 242 effects, among other things, both the resiliency of the blade and its cutting effectiveness. For optimum performance, the blade 242 must be stiff yet flexible. The blade 242 should be stiff enough to easily puncture the shell of a pumpkin and be rigid enough to cut through the shell without bending. In addition, the blade 242 should also be flexible, which increases its ability to carve intricate designs and elaborate details. As shown in FIG. 5, the blade 242 has a longitudinal plane Y that travels through the center of the blade. When force is exerted on the free end 404 of the blade 242, the free end 404 of the blade deflects either to the right or to the left of the blade's longitudinal plane Y. This flexibility of the blade 242 of the electric knife 100 is helpful in the carving of pumpkins or other vegetables. The person using the electric knife 100 will have an easier time following the curved line of a stencil or making complex cuts with the flexible blade 242 of the illustrated embodiment.

The thinner the blade 242 is, the more easily it will pierce and cut through the pumpkin or other vegetable. A thinner blade 242 is also more flexible and this would allow for detailed carving. However, if the blade width W is too small, the blade would not be stiff enough to effectively pierce the shell of the pumpkin or other vegetable and carve it effectively and could break easily. The blade 242 has a width W that is between 0.010 inches and 0.100 inches but is preferably between 0.020 inches and 0.050 inches. The blade 242 of the illustrated embodiment has a width W of 0.024 inches. It should be apparent to those skilled in the art, however, that other dimensions of blade width could be used, and the present invention is not limited to the disclosed width W dimensions. This width W was chosen for the blade 242 of the illustrated embodiment because it provides a good balance of the flexibility for successfully carving detailed designs and the strength to resist breaking during normal use. The width of the blade W was also adapted to ensure that the safety tip 406 of the blade 242 can easily puncture the shell of a pumpkin or other fruit or vegetable.

The blade 242 has a cutting edge 408 and a smooth edge 410 that are parallel to each other. However, the blade 242 could have many configurations in alternative embodiments, for example the blade could have two opposable cutting edges. The blade 242 has a plurality of forwardly projecting blade teeth 412 that are situated along the cutting edge 408 of the blade.

The forwardly projecting orientation of the blade teeth 412 serves as a safety feature. Generally, for the teeth of a blade to cut something, the object that is being cut must exert a resistance to the blade so the teeth can pierce the object. If an object offers little resistance to a blade, the chance that the blade's teeth will cut into the object are diminished. The forwardly projecting blade teeth 412 of the illustrated embodiment are less likely to cut human skin than typical blade teeth. Due to the elastic qualities of human skin, if the blade 242 were to be rested on a human hand, for instance, and activated, the skin would simply move forward a small amount and accommodate the movement of the blade. Conversely, if the blade teeth 412 faced towards the housing 110, they would tend to pull the skin toward the housing. If the skin were pulled in a close proximity to the housing 110, there is a likelihood that a "pinch point" would be formed between the blade teeth 412 and the housing 110. This pinching would result in the skin exerting a resistance to the blade, and the likelihood that the skin would be cut is considerably greater than with forward projecting teeth. The forwardly projecting orientation of the blade teeth 412 also serves to move material away from the housing, thereby lessening the chance of material getting into the housing.

As shown in FIG. 6, each of the blade teeth 412 have a tooth height h. With blades of certain designs, the tooth height h affects, among other things, both the safety and cutting effectiveness of the blade 242. Human skin has a more elastic quality than the shell of a pumpkin or other vegetable. Human skin and flesh does not rigidly resist a pressure that is exerted against it but, rather, deforms somewhat when pressed against. A blade with smaller tooth heights h is safer because when the blade is pressed up against human skin, the skin merely indents to accommodate the teeth. Accordingly, if the blade were then rubbed across the skin, the shallow teeth would not encounter much resistance, and would be less likely to cut or scratch the skin. Human skin and flesh only possesses a certain amount of elasticity, however, and are only capable of deforming a limited amount. Accordingly, a blade having teeth with larger tooth heights h would be more likely to cut or scratch the skin of a human.

However, a blade possessing teeth with a small tooth height h would be less efficient at cutting a pumpkin or other vegetable. As the tooth height h of the blade is decreased, the amount of vegetable matter that would be cut into and cleared away with each pass of the blade is also decreased. Consequently, a blade with a larger tooth height h would cut away more vegetable matter with each stroke than a blade with a smaller tooth height h. If both the blades were operating at the same speed, it would take less time to carve the same design into a pumpkin or other vegetable with a blade with a larger tooth height h than it would take using a blade with a smaller tooth height h. As the tooth height h is increased, however, the amount of resistance that the blade encounters when cutting through the pumpkin or other vegetable matter also increases. Thus, it would require more power to drive a blade with a larger tooth height h than a blade with a smaller tooth height h. Accordingly, all of these various factors must be balanced to arrive at an optimum tooth height h which is accomplished in the invention.

The tooth height h is between 0.010 inches and 0.100 inches but is preferably between 0.020 inches and 0.08 inches. In the illustrated embodiment, the blade teeth 412 have a tooth height of 0.032 inches. It should be apparent to those skilled in the art, however, that other dimensions of blade tooth height h could be used, and the present invention is not limited to the disclosed tooth height h dimensions. This tooth height h was chosen for the illustrated embodiment because it provides a good balance of the safety features, cutting effectiveness, and power requirements that are associated with tooth height h.

As shown in FIG. 5, each blade tooth 412 has a tooth offset 502 with each blade tooth being bent to one side of the longitudinal plane Y in an alternating fashion. Accordingly, if one blade tooth 412 is bent outward to one side of the longitudinal plane Y, the teeth on either side of the blade tooth 412 will be bent outward to the opposite side of the longitudinal plane. Accordingly, each of the teeth 412 are situated at an angle to the longitudinal plane Y of the blade. Blades with a larger tooth offset 502 cut through pumpkins and other vegetables more effectively because they create a wider incision into the shell of the vegetable. Due to the larger width of the incision, the blade has more room in which to travel and the sides of the blade do not rub against the shell of the pumpkin as much as they would if the incision were narrower. This decreasing of the resistance on the blade allows the blade to carve the pumpkin or other vegetable with less power being required from the electric motor. Accordingly, blades with a larger tooth offset 502 carve pumpkins more effectively and do not require as much power from the electric motor. However, since they cut more effectively, blades with a larger tooth offset 502 can cut the skin or flesh of a human more easily.

Each blade tooth 412 has a tooth offset 502 that is between 0.001 inches and 0.040 inches but preferably is between 0.005 inches and 0.035 inches. The blade teeth 412 of the illustrated embodiment each have a tooth offset 502 of 0.018 inches. It should be apparent to those skilled in the art, however, that other dimensions of tooth offset could be used, and the present invention is not limited to the disclosed tooth offset dimensions. This tooth offset 502 was chosen because it provides a good balance of safety and cutting effectiveness.

In one method of manufacturing the blade 242 of the illustrated embodiment, the tooth offset 502 of the blade teeth 412 are formed through a two step raking process. Due to the alternating fashion of the tooth offsets 502, the blade 242 has a first set of blade teeth 412 that are bent outward from the blades longitudinal axis Y in one direction and a second set of blade teeth that are bent outward from the blades longitudinal axis in the opposite direction. A first stamping die is used to cut a portion of the blade 242 along with the first set of teeth 412 from a piece of metal or other material and bend the teeth outward from the longitudinal axis Y of the blade. A second stamping die is then used to cut an additional portion of the blade 242 and the second set of teeth 412 and bend them outward from the longitudinal axis Y in the opposite direction as the first set of teeth.

This two step stamping procedure both cuts the blade 242 from a piece of metal or other material and produces the tooth offset 502 in one process. The tooth offset 502 dimension of the illustrated embodiment was chosen because it can be produced through such a process. The production of larger tooth offsets may require additional steps since only a certain dimension of tooth offset 502 can be produced with a single stamping procedure for each tooth. For example, an additional step may be necessary to bend the teeth out further if one stamping procedure cannot produce the desired tooth offset by itself. In addition, the stamping process used to create the blade 242 of the illustrated embodiment produces a blade that does not require sharpening to effectively carve pumpkins and other vegetables. This eliminates the need for a sharpening step in the manufacturing of the blade 242 and thereby lowers the production cost of the blade of the electric knife 100 of the illustrated embodiment.

As illustrated in FIG. 6, the blade teeth 412 have a pitch 602. The pitch 602 is the distance between each tooth 412. The pitch 602 of the blade affects, among other things, the cutting ability of the blade 242. A blade with a larger pitch will have less teeth than a blade of the same length with a smaller pitch. Accordingly, a blade with a smaller pitch will cut and remove more pumpkin or other vegetable matter with each stroke since it possesses a greater number of teeth. However, if the distance between the blade teeth is too small, pieces of pumpkin shell or other vegetable matter are likely to be lodged within the small space between each tooth. This would detract from the effectiveness of the knife.

With these factors in mind, the pitch 602 is between 0.030 inches and 0.200 inches but is preferably between 0.06 inches and 0.180 inches. In the illustrated embodiment, the blade teeth 412 have a pitch 602 of 0.078 inches. It should be apparent to those skilled in the art, however, that other pitches 602 could be used, and the present invention is not limited to the disclosed pitches 602. The pitch 602 of the illustrated embodiment was chosen because it provides a good balance of the considerations mentioned above.

Each blade tooth 412 also has a radiused blade tip 604. The radiused blade tip 604 of each tooth 412 is between 0 inches and 0.04 inches but is preferably between 0 inches and 0.02 inches. In the illustrated embodiment, the blade teeth 412 have a 0 inch radius. It should be apparent to those skilled in the art, however, that other dimensions of radiused blade tip 604 could be used, and the present invention is not limited to the disclosed radiused blade tip dimensions.

Figure 7A:
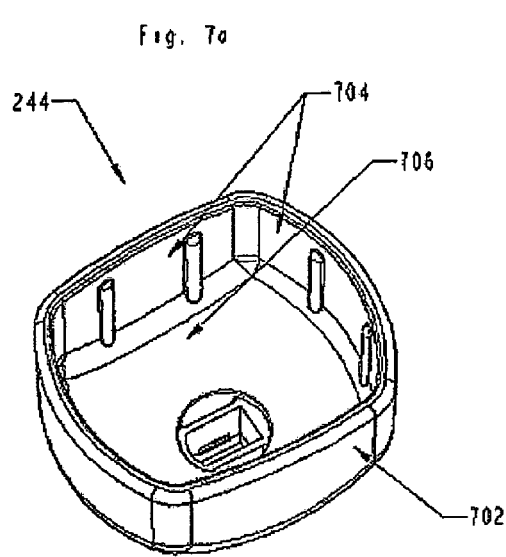
FIG. 7A is a perspective view of the top of the shield of the electric knife of FIG. 1.
Figure 7B:
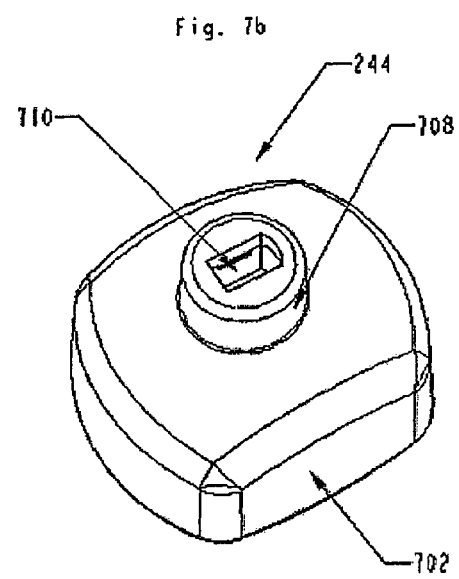
FIG. 7B is a perspective view of the bottom of the shield of the electric knife of FIG. 1.

Optionally, the blade assembly 120 of the electric knife 100 can include a shield 244. Preferably, the shield 244 is molded as one piece out of a suitable material such as plastic, however the shield could be assembled out of multiple pieces as well. As illustrated in FIGS. 7A and 7B, the shield 244 has a generally bowl-like shaped main portion 702, having a side wall 704 that defines a housing receiving opening 706. A projection 708 extends outward from the main portion 702. A blade mount opening 710 is defined within the projection 708.

The housing receiving opening 706 of the shield 244 is adapted to fit over the shield mounting portion 226 of the housing 110 and the side wall 704 of the shield 244 surrounds and covers a part of the shield mounting portion 226 of the housing 110. The blade mount opening 710 of the projection 708 of the shield 244 is adapted to attach to the blade mount 240 of the electric knife 100 and form a tight seal around the blade mount 240. In addition, the blade 242 may optionally be molded into the blade mount 240 to further ensure that no vegetable pulp or other matter enters the housing 110. The shield 244 travels in conjunction with the blade mount 240. When the blade mount 240 reciprocates the shield 244 reciprocates along with it. The shield 244 also eliminates a "pinch point" between the blade 242 and the housing 110.

The dimension of the shield mounting portion 226 of the housing 110 is configured to provide clearance between the side wall 704 of the shield 224 and the housing 110 at every point of the shield's reciprocating stroke. The clearance provided by this design was chosen to minimize the risk that a user's hand or finger would be pinched between the shield 244 and the housing 110. The shield 244 is not limited to the structure illustrated in the present embodiment. The shield 244 could be simply a flat plate or any other shape that forms a barrier between the housing 110 and the vegetable that is being carved. The shield 244 could also be a boot formed out of a flexible material that prevents water, vegetable matter, or other materials from entering the housing 110.

When using the electric knife 100 of the illustrated embodiment to either puncture or carve a pumpkin or other vegetable, the user will often need to drive the blade 242 deep into the shell of the vegetable. As the blade 242 of the electric knife 100 is pushed into the vegetable, often the housing 110 will directly abut against or even stick into the vegetable matter that is being carved. When the housing 110 abuts against or sticks into the vegetable matter, there is the possibility that some of this vegetable matter, either pieces of the vegetable's shell or its pulp, could travel into the housing 110 and interfere with the moving parts of the electrical knife. The shield 244 prevents this from occurring by effectively sealing the entry to the housing 110 from the vegetable being carved. Accordingly, with the shield 244 in place, the electric knife 100 of the illustrated embodiment can be stuck into the vegetable without the user running the risk of vegetable matter entering the housing 110. This design increases the effectiveness of the electric knife 100 and allows for effective deep cuts into a vegetable.

The electric knife 100 also includes an electric motor 246. The electric motor 246 is supported and enclosed within the electric motor compartment 218 of the housing 110. The electric motor 246 has a generally cylindrically shaped motor cage 248 and a protruding output shaft 250 that rotates when the motor is activated. During the design of the electric knife 100, multiple types and configurations of electrical motors were tested to produce the optimum combination of manufacturing cost savings, safety, and effectiveness of cutting. Various electric knife 100 prototypes were tested using assorted combinations of motor cage sizes, wire sizes, number of wire winds, and magnet types. The electric motor 246 rotates its output shaft 250 at between 12,000 revolutions per minute to 20,000 revolutions per minute when no load is placed on the motor but preferably the electric motor rotates its output shaft at between 14,000 revolutions per minute to 17,000 revolutions per minute when no load is placed on the motor. The electric motor 246 of the illustrated embodiment operates on 6 volts and generally rotates its output shaft 250 at a rate of 15,720 revolutions per minute when no load is placed on the motor. It should be apparent to those skilled in the art, however, that various electric motors could be used, and the present invention is not limited to the disclosed electric motor outputs. The configuration of the motor of the illustrated embodiment was chosen because it provides a superior combination of safety, cutting effectiveness and manufacturing cost.

The electric knife 100 includes an activation switch 130. In the illustrated embodiment, the activation switch 130 is a momentary switch but many different types of switches could be used. In the illustrated embodiment, the momentary switch 130 includes a deformable membrane 252, which acts as a push-button, located within the activation switch opening 214 of the cover 204. When pressed, the deformable membrane 252 contacts an interior switch 254 (that is connected to the electric motor 246 by wiring not shown) that completes an electrical circuit and activates the electric motor 246. The electric motor 246 continues to run until the momentary switch 130 is released. However, alternative embodiments may include switches that do not have to be continuously pressed to activate the electric motor 246. The deformable membrane 252 of the activation switch 130 of the illustrated embodiment is formed from rubber and creates a water-resistant seal that protects the electrical components of the electrical knife by preventing water, vegetable matter, or other fluids from entering the housing 110. It should be apparent to those skilled in the art that the present invention could include many different types of switches and other embodiments may not include an interior switch 254 or deformable membrane 252.

The electric knife 100 includes a gear assembly 256. In the illustrated embodiment, the gear assembly 256 is fashioned out of plastic, but other suitable materials, such as metal, could be used. The gearing assembly of the illustrated embodiment includes a main gear 258 mounted for rotation within the housing 110 that engages with a cylindrical gear 260 mounted on the output shaft 250 of the electric motor 246. The gearing assembly is supported and enclosed within the gear assembly/blade mount compartment 220 of the housing 110.

When the electric motor 246 is activated and the output shaft 250 of the electric motor rotates, the cylindrical gear 260 mounted on the output shaft 250 rotates and drives the main gear 258 of the gear assembly 256. The main gear 258 is mechanically connected with the gear assembly receiver portion 310 of the blade mount 240. The main gear 258 together with the gear assembly receiver portion 310 of the blade mount 240 convert the rotational motion of the cylindrical gear 260 mounted on the output shaft 250 of the electric motor 246 into a reciprocating motion. Accordingly, as the cylindrical gear 260 turns, the main gear 258 of the gearing assembly turns; as the main gear 258 turns, the gear assembly receiver portion 310 of the blade mount 240 is driven to reciprocate. It should be apparent to one skilled in the art that several configurations of gear assemblies could be utilized.

The gear ratio of the electric knife 100 affects, among other things, the length of the blade stroke. The stroke of the blade affects both the safety of the blade and the blade's cutting effectiveness. Human skin has a more elastic quality than the shell of a pumpkin or other vegetable. Human skin and flesh does not rigidly resist an object that is rubbed against it but, rather, shifts slightly in conjunction with the movement of the object. If a blade were rubbed against the skin of a human and the skin were able to shift with the blade during its entire stroke, the shifting of the skin would decrease the resistance of the skin against the blade and the likelihood that the blade would cut into the skin. Human skin has a limited range of motion, however, and can only shift a certain amount. Accordingly, a blade that has a shorter stroke is safer than a blade with a larger stroke because there is a greater likelihood that human skin would be able to shift a sufficient amount to prevent the skin from being cut. With these factors in mind, the stroke of the blade is between 0.05 and 1.5 inches but is preferably between 0.1 inches and 0.5 inches. The blade 242 of the illustrated embodiment has a stroke of 0.197 inches. It should be apparent to those skilled in the art, however, that other dimensions of blade stroke could be used, and the present invention is not limited to this disclosed blade stroke. This blade stroke was chosen because it provides a good balance of the safety and cutting effectiveness considerations mentioned above.

The electric knife 100 of the illustrated embodiment includes four 1.5 volt AA alkaline batteries (not shown) that are supported and enclosed within the battery compartment 216 of the housing 110. The batteries are electronically connected with the electric motor 246 and the activation switch 130 of the electronic knife by wires not shown and they power the electric motor. Different types and numbers of batteries could be effectively used. During the design stages of one embodiment of the present invention, various prototypes of the electric knife 100 were tested using between two 1.5 volt batteries and six 1.5 volt batteries. When determining the number of batteries to be included with the illustrated embodiment, both the effectiveness of the knife, the manufacturing cost, and the size of the housing 110 were considered. The use of four batteries was chosen because this configuration produces the blade speed and power necessary to satisfactorily carve pumpkins and other vegetables for the lowest manufacturing cost with the smallest housing size. It should be apparent to those skilled in the art that the present invention could also be powered by other power sources, for example the electric knife of the present invention could be adapted to be powered by standard household electrical current or a direct current power sources, such as a vehicle's cigarette lighter.

The electric knife 100 includes a battery cap 140 that seals the battery compartment 216 of the housing 110 and secures the batteries in place. The battery cap 140 is preferably molded as one piece out of a suitable material such as plastic. In the illustrated embodiment, the battery cap 140 has a generally cup-like shape with a rounded bottom and is secured to the housing 110 by a plurality of inter-engaging tabs and slots. However, the battery cap 140 could also be secured to the housing 110 using other fastening methods such as locking slots and grooves, multiple clips, screws, etc.

The rounded cup shape of the battery cap 140 prevents the electric knife 100 from being stood upright on its end on a table or other surface. If the knife were able to stand up on its end, the upward extending blade 242 of the electric knife 100 could prove to be hazardous. Even though the knife includes a blunted radiused safety tip 406 and does not readily cut human flesh, if an object, for example a human hand, exerted a sufficient downward force on the blade 242 while the knife was standing on its end, either intentionally or accidentally, the blade could pierce the object. Accordingly, the rounded cup shaped battery cap 140 serves as a safety feature because it makes the electric knife 100 incapable of standing on its end, therefore averting the dangers that could arise if the electric knife 100 were able to stand on its end.

To use the electric knife 100 of the illustrated embodiment, the user grasps the housing 110 of the electric knife 100. The contoured shape of the housing 110 makes this a more secure grip and more comfortable for the user. To begin carving a pumpkin or other vegetable, the user places the blunted safety tip 406 of the blade 242 against the shell of the vegetable and exerts sufficient force on the housing 110 to cause the tip 406 of the blade to pierce the shell. The thin profile of the blade 242 allows the blade to easily pierce the shell and the user need not exert much force to accomplish this. The shield 244 ensures that no vegetable matter enters into the housing 110 when the electric knife 100 is pushed into the pumpkin or other vegetable.

Once the blade 242 is inserted a sufficient amount into the shell of the pumpkin, the user activates the electric motor 246 using the activation switch 130 located on the cover 204 of the housing 110. The output shaft 250 of the electric motor 246 turns along with the cylindrical gear 260 attached to the output shaft 250. The cylindrical gear 260 drives the main gear 258. The main gear 258 and the gearing assembly receiving portion convert the rotary motions of the electric motor 246 into a reciprocating motion which is transferred to the blade mount 240. The blade mount 240 drives the blade 242, thus as the blade mount 240 reciprocates back and forth within the blade mount housing 238, the blade reciprocates as well. When the blade 242 reciprocates, the shield 244 reciprocates as well, thereby preventing any water, vegetable pulp or other matter from entering the housing. In the illustrated embodiment, the blade 242 extends outward from the housing 110 in a plane that is generally parallel to the housing 110's longitudinal axis X. The blade 242 travels outward from the housing 110 and inward to the housing 110 along this axis X. As the blade mount 240 travels forward the blade 242 is driven forward, and as the blade mount 240 pulls back within the blade mount housing 238, the blade is pulled back. As the blade 242 is reciprocated in this manner, the plurality of blade teeth 412 cut through the shell and pulp of the vegetable being carved. While the electric motor 246 is activated and the blade 242 is reciprocating, the user maneuvers the blade to create the desired incisions into the pumpkin or other vegetable. The shape of the housing 110 benefits this process since it provides the user with a firm, comfortable grip.

The electric motor 246 is only activated while the activation switch 130 is pressed down. This feature provides for added control of the carving procedure. Since the blade 242 is only in motion while the activation switch 130 is pressed down, the electric knife 100 ceases to carve once the activation switch 130 is released. Accordingly, a person that is carving a pumpkin or other vegetable can closely control the incisions that are being made into the shell by releasing the activation switch 130 when they want to cease carving the pumpkin. This feature provides the user with the ability to make detailed, exact incisions into the pumpkin and increases the likelihood that the user will be pleased with the final design.

Figure 8:
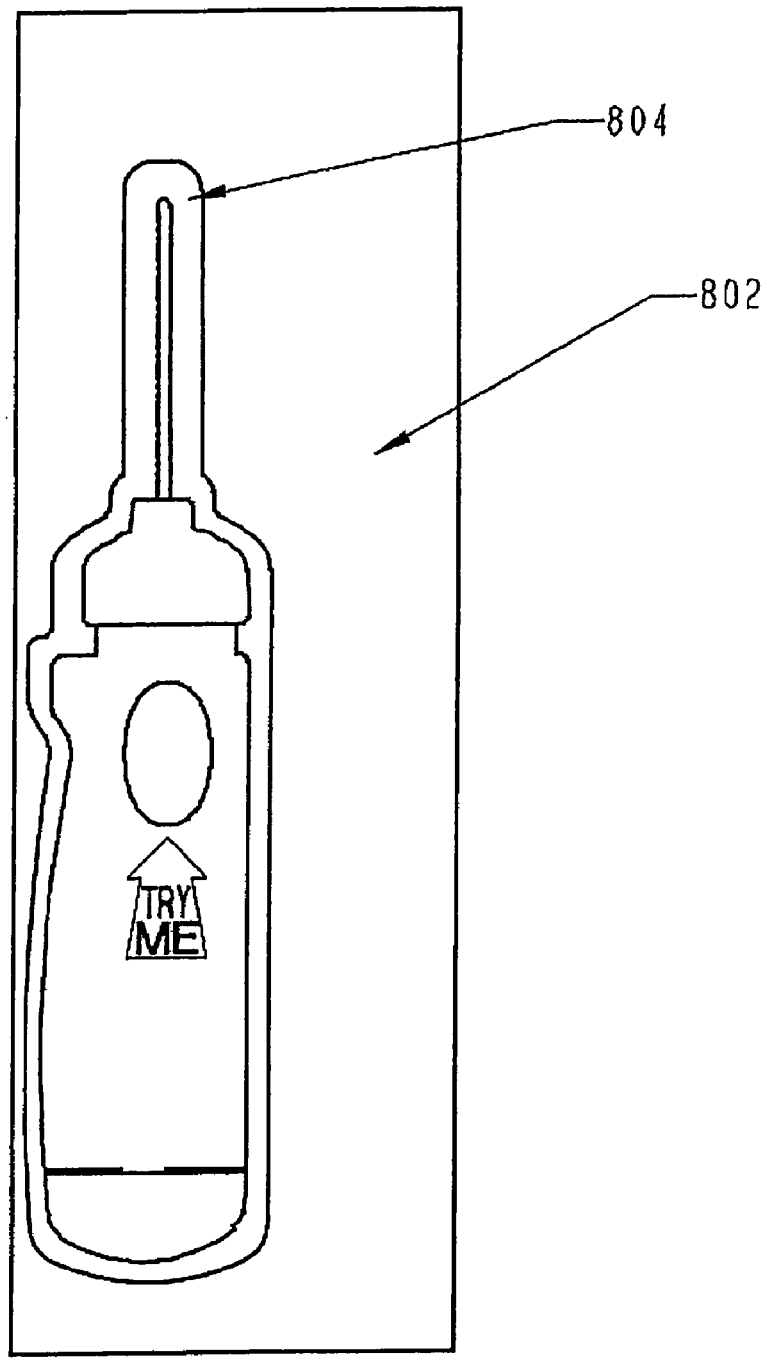
FIG. 8 is a perspective view of the electric knife of FIG. 1 in packaging.

Due to the placement and functionality of the activation switch 130, the electric knife 100 of the illustrated embodiment can be placed in pliable packaging 802 that is transparent, and the customer can press the activation switch 130 and see it operating while the knife is still in its packaging. As shown in FIG. 8, the shape of the packaging 802 closely mimics the configuration of the knife, except the portion of the packaging 804 that houses the blade 242 of the electric knife 100 includes added clearance that allows the blade to reciprocate within the package without damaging the package. Consequently, the consumer can become associated with the easy operation of the electric knife 100 while it is still sealed in its packaging. Optionally, the packaging 802 could include a window to allow a consumer to access the activation switch through the packaging 802.

What is claimed is:

1. An electric pumpkin carving knife comprising:
a housing forming a handle of the knife,
an electric motor in the housing sized and structured
for powering by two to six 1.5V alkaline batteries and
for producing an output of generally between 12,000 and 20,000 revolutions per minute when under no load,
and
a single pumpkin blade, the pumpkin blade being operatively connected to the electric motor so that, when the motor is actuated, the pumpkin blade reciprocates with a blade stroke of between 0.05 inch and 1.5 inches, wherein the pumpkin blade
has generally dull teeth so that the pumpkin blade will readily cut the flesh of a pumpkin but not human skin when the motor is actuated,
is stiff enough to easily puncture the flesh of a pumpkin yet flexible enough to bend while cutting though the flesh of a pumpkin without breaking, and
has a blade height of 0.05 inch to 0.3 inch and a width of 0.01 inch to 0.1 inch to allow the knife to carve intricate designs and elaborate details in the flesh of a pumpkin.

2. The electric pumpkin carving knife of claim 1, wherein the maximum blade height is 0.2 inch.

3. The electric pumpkin carving knife of claim 2, wherein the pumpkin blade has a blade height of 0.1 inch to 0.2 inch and a width of 0.02 inch to 0.05 inch.

4. The electric pumpkin carving knife of claim 3, wherein the dull teeth of the pumpkin blade have a forwardly projecting profile, a pitch of 0.06 inch to 0.18 inch, and a tooth height of 0.02 inch to 0.08 inch.

5. The electric pumpkin carving knife of claim 2, wherein the dull teeth of the pumpkin blade have a forwardly projecting profile, a pitch of 0.03 inch to 0.2 inch, and a tooth height of 0.01 inch to 0.1 inch.

6. The electric pumpkin carving knife of claim 1, wherein the housing is elongated and defines a longitudinal direction, and further wherein the pumpkin blade is generally aligned with the longitudinal direction of the housing and operatively connected to the electric motor so that, when the motor is actuated, the pumpkin blade reciprocates in a direction generally along the longitudinal direction of the housing.

7. The electric knife of claim 1, further comprising a blade mount mounting the pumpkin blade, the blade mount being operatively connected to the motor and mounted in the housing so that, when the motor is actuated, the blade mount reciprocates generally along the longitudinal direction of the housing.

8. The electric knife of claim 1, wherein the housing defines a generally closed chamber for receiving the electric motor and a blade mount, and further wherein the pumpkin blade passes through an opening in the housing which is small enough to substantially prevent cut pumpkin matter from entering the housing.

9. The electric knife of claim 8, further comprising a shield attached to and completely surrounding the pumpkin blade, the shield being attached to the pumpkin blade so that it reciprocates along with the pumpkin blade when the motor is actuated, the shield covering the opening in the housing for preventing cut pumpkin matter from entering the housing.

10. The electric knife of claim 1, wherein the pumpkin blade is generally flat and further wherein the height and width of the pumpkin blade are essentially constant over the portion of the pumpkin blade defining its teeth.

11. The electric knife of claim 10, wherein at least some of the teeth of the blade are offset from the plane of the blade.

12. The electric knife of claim 1, further comprising a blade mount operatively connected to the electric motor, the pumpkin blade being permanently mounted on to the blade mount.

13. An electric pumpkin carving knife comprising:
 a housing forming a handle of the knife, wherein the housing is elongated and defines a longitudinal direction,
 an electric motor in the housing sized and structured
  for powering by 2 to 6 1.5V alkaline batteries and
  for producing an output of generally between 12,000 and 20,000 revolutions per minute when under no load,
and
 a single pumpkin blade, the pumpkin blade being generally aligned with the longitudinal direction of the housing and being operatively connected to the electric motor so that, when the motor is actuated, the pumpkin blade reciprocates with a blade stroke of between 0.1 inch and 0.5 inches, wherein the pumpkin blade
  has generally dull teeth so that the pumpkin blade will readily cut the flesh of a pumpkin but not human skin when the motor is actuated, a unsharpened teeth having a forwardly projecting profile, a pitch of 0.06 inch to 0.18 inch, and a tooth height of 0.02 inch to 0.08 inch,
  is stiff enough to easily puncture the flesh of a pumpkin yet flexible enough to bend while cutting though the flesh of a pumpkin without breaking, and
  has a blade height of 0.05 inch to 0.3 inch and a width of 0.01 inch to 0.1 inch to allow the knife to carve intricate designs and elaborate details in the flesh of a pumpkin.

* * * * *